(12) United States Patent
Baumbusch et al.

(10) Patent No.: US 6,348,029 B1
(45) Date of Patent: Feb. 19, 2002

(54) MACHINE TOOL

(75) Inventors: Frank Baumbusch, Eberbach; Walter Bauer, Simmozheim, both of (DE)

(73) Assignee: Witzig & Frank GmbH (DE)

( * ) Notice: Subject to any disclaimer, the term of this patent is extended or adjusted under 35 U.S.C. 154(b) by 0 days.

(21) Appl. No.: 09/700,987

(22) PCT Filed: Sep. 3, 1999

(86) PCT No.: PCT/EP99/06479

§ 371 Date: Nov. 15, 2000

§ 102(e) Date: Nov. 15, 2000

(87) PCT Pub. No.: WO00/13842

PCT Pub. Date: Mar. 16, 2000

(30) Foreign Application Priority Data

Sep. 5, 1998 (DE) .......................................... 198 40 606

(51) Int. Cl.[7] ................................................ B23Q 3/157
(52) U.S. Cl. ........................ 483/31; 279/4.11; 279/900; 483/1; 483/54; 483/55
(58) Field of Search .............................. 483/31, 32, 30, 483/54, 55, 56, 57, 59, 34, 35, 1, 3, 13; 279/900, 4.06, 4.11

(56) References Cited

U.S. PATENT DOCUMENTS

| | | | | |
|---|---|---|---|---|
| 4,651,405 A | * | 3/1987 | McMortry ................ 483/31 |
| 4,719,690 A | * | 1/1988 | Eckle .................... 279/900 X |
| 5,111,573 A | * | 5/1992 | Ito et al. ................... 483/1 |
| 5,730,691 A | | 3/1998 | Tokura et al.. | |
| 5,820,538 A | * | 10/1998 | Watkinson ................ 483/59 |
| 5,853,358 A | * | 12/1998 | Takenaka ................ 483/3 X |
| 5,919,120 A | * | 7/1999 | Pumphrey .............. 483/13 X |
| 5,954,623 A | * | 9/1999 | Davis ..................... 483/35 |
| 6,241,645 B1 | * | 6/2001 | Van Hinsbergh ............ 483/1 |

FOREIGN PATENT DOCUMENTS

| | | |
|---|---|---|
| DE | 1477 429 | 1/1979 |
| DE | 38 05 527 A1 | 8/1989 |
| DE | 44 31 375 A1 | 3/1996 |
| DE | 27 37 225 | 8/1997 |
| EP | 433 248 A1 | 6/1991 |
| EP | 0 890 402 A1 | 1/1999 |
| JP | 132 940 | * 8/1982 ............ 483/34 |
| JP | 36 2193712 | * 8/1987 ............ 483/34 |

* cited by examiner

Primary Examiner—William Briggs
(74) Attorney, Agent, or Firm—McGlew & Tuttle, P.C.

(57) ABSTRACT

The invention relates to a machine tool comprising at least one machining unit having at least one work spindle which can be driven. The machine tool also comprises at least one tool magazine arranged in the working area, and has actuating devices for automatically shifting the tools between the tool holding fixture situated on the spindle and the tool holding fixture situated on the tool magazine. The tool holding fixture situated on the spindle is provided with a hydraulic expansion chuck which, with the aid of the spindle, can automatically press against the tool shaft of a tool.

16 Claims, 10 Drawing Sheets

MACHINE TOOL

FIELD OF THE INVENTION

The present invention pertains to a machine tool for workpiece machining, including triaxial machining of workpieces and more particularly to a machine tool with at least one machining unit, which has at least one work spindle which can be rotatably driven around an axis of rotation, provided with a revolver head that has a plurality of driven spindles, which carry a tool in a tool carrier each and are displaceable in a work space in the X, Y and Z directions and with at least one tool magazine arranged in the work space.

BACKGROUND OF THE INVENTION

A machine tool of this type with a revolver head and a tool magazine arranged in the work space, which has the features noted above, is shown in EP 433 248 A2.

Machine tools with a revolver head makes possible a rapid tool change by simple rotation of the revolver head. However, the number of tools arranged on a revolver head is usually limited to eight tools. It is common practice for repetition work, e.g., in so-called CNC-controlled machining centers, to replace the tools in one operation manually when all eight tools arranged on the tool revolver have become worn or otherwise unfit for use. Even though the number of available tools can be increased by using a plurality of tool revolvers in the case of the use of multi-station machine tools, this is, of course much more complicated and expensive.

A machine tool with a revolver head for mounting tools with a coaxial drum magazine for storing additional tools and with an automatic means for delivering the tools from the magazine into a working position at the revolver head has been known from DE 27 37 225 A1, where a separate lifting means for transporting the tools from and to the drum magazine is provided in the revolver head. This additional lifting means as well as the concentrically arranged drum magazine proper require relatively much space. In addition, displaceability of the revolver head in the X, Y and Z directions is not provided here.

Another machine tool with automatic tool change is described in DE-OS 14 77 429, in which the tool spindle and the tool magazine are arranged on a common carriage and the magazine holds the tools by means of the spindle at right angles to the spindle axis. A separate gripper-type change mechanism is likewise provided for the tool change here, where the gripper first removes the tools from the magazine in the direction of the spindle axis, then pivots them into the spindle axis and finally pushes them again into the spindle. This type of tool change is also complicated and time-consuming.

A hydraulic clamping device for the detachable precision holding of machine parts, which is also called a hydraulic expansion clamping device, has been known from EP 890 402 A1. This has axially parallel, especially cylindrical holding surfaces with wall parts which can be bent out elastically, which define a hollow space, which is connected to at least one hydraulic pressure source. The pressure source comprises a piston, which is moved by a manually actuated hexagon socket screw arranged in a threaded hole of the housing. Automatic adjustment of the hexagon socket screw is not provided for here and would also lead to increased wear and, because of the complicated coupling of the screwing tool, to a slowdown of the tool change process.

SUMMARY AND OBJECTS OF THE INVENTION

The basic object of the present invention is therefore to provide a machine tool of this type that makes possible a rapid, automatic tool change between the tool carrier on the spindle and a tool magazine within the work space.

According to the present invention, the tool carriers of the spindle and of the tool magazine are arranged in the work space for the tool change and are preferably moved from their longitudinal direction from one tool carrier into the other tool carrier by means of an actuating means arranged at the tool magazine, which preferably comprises only a lifting cylinder and a guide sleeve. A precision tool carrier, which comprises a hydraulic expansion chuck according to the present invention and makes possible a very high accuracy of fit, is arranged according to the present invention at the spindle.

One peculiarity is that the individual tools do not have intermediate holders of their own, with which the tools are usually accurately positioned at the tool spindle. The tools are moved according to the present invention without intermediate holder between the magazine and the spindle. The elimination of the so-called intermediate holder is made possible by the fact that the spindle of the revolver head can be positioned exactly at the tool carrier of the tool magazine and the tool shank can be pushed in a correctly fitting manner into the tool carrier of the spindle preferably with a simple change slide.

Furthermore, provisions are made according to the present invention for the hydraulic expansion chuck to be clamped and released automatically by means of the spindle. To do so, a ring, which actuates at least one linearly movable hydraulic piston to change the pressure of the hydraulic expansion chuck, is rotatably movable on the tool carrier of the spindle. To actuate the hydraulic piston, the ring performs a movement relative to the tool carrier of the spindle by the spindle being rotated with the tool carrier and the ring being fixed on the tool carrier of the tool magazine by means of a rotation prevention device. The drive of the spindle is thus used in a simple manner to change the pressure of the hydraulic medium by means of the hydraulic piston and to release or clamp the hydraulic expansion chuck. The tool change can consequently be performed automatically and within a very short time and without manual intervention in the closed work space.

To change the pressure in the hydraulic space, it proved to be favorable to push the hydraulic piston to the outside by spring force, on the one hand, and to move it inward against the spring force by actuating the ring, on the other hand.

The ring arranged rotatably movably on the tool carrier may consist of a threaded ring or a tensioning nut and be moved in a defined manner in the axial direction by its rotary movement relative to the tool carrier and to also one or more hydraulic pistons in the axial direction, which ensure a change in the pressure at the hydraulic expansion chuck. Instead of a threaded ring, which can be moved axially continuously and over any desired number of revolutions, it is also possible to use an eccentric ring, which can move the hydraulic piston toward the center of the hydraulic expansion chuck during a rotary movement by, e.g., 90°. As an alternative to this, the releasing and clamping of the hydraulic expansion chuck may also be brought about by means of a slot on the chuck and changer housing. The hydraulic piston is preferably arranged radially in this case, but it may also be directed inwardly at any desired oblique angle.

The use of the hydraulic expansion chuck has the advantage that the tools can be mounted without clearance with a very high repeating accuracy of approx. 0.002 mm.

The tool magazine is designed especially as a round magazine with a central axis of rotation and a rotating drive belonging to it, wherein preferably four or five tool carriers are arranged on a common bridge axially in parallel, distributed over the circumference, with an actuating device acting in the direction of the axis of rotation acting centrally on the bridge. This actuating device, which is expediently designed as a lifting or hydraulic cylinder, has a change slide, which is mounted displaceably on guide elements fastened to the housing. This change slide is directly connected to the central lifting cylinder and via the bridge to the tool carriers arranged distributed over the circumference. The bridge extends at right angles to the axis of rotation of the tool magazine and has arms which extend to the outside in a star-shaped pattern and on which at least two gripping arms and/or plate springs each, which are laterally in contact with the tool under pretension are fastened for mounting the tools. In addition, guide elements, which extend axially in parallel to the axis of rotation of the tool carriers, are guided in the arms of the bridge for displacing the tool carriers during the tool change. Compression springs, which act against the actuating device and with which the tools arranged in the tool carriers of the magazine are pressed into the housing of the tool magazine, are arranged at the guide elements. For tool change, the tools are then pressed from the housing into the tool carriers of the spindle on the revolver head by means of the central lifting cylinder against the force of the compression spring. Consequently, the tool is held by the compression springs in the tool magazine and is protected there by the housing from contamination and mechanical damage, on the one hand, and, on the other hand, it is pushed into the hydraulic expansion chuck on the spindle in an accurately fitting manner by a well-defined force applied by the lifting cylinder.

Consequently, preferably four or five tools can be additionally automatically removed from the tool magazine one after another besides the, e.g., eight tools arranged on the revolver head by means of this tool change device by a short and rapid displacement of the revolver head and by a defined movement of the lifting cylinder arranged in the tool magazine. The tool magazine can then be displaced and/or pivoted around a tilt axis from a change position (see FIG. 1) into a resting position (see FIG. 2) outside the outer contour of the tools arranged on the revolver head. The work process is therefore not hindered by the tool magazine which can be displaced in the work space with the revolver head.

As an alternative to the round magazine, the tool magazine may also be designed as a cog strip with tool carriers arranged next to one another, which is displaceable with the revolver head. However, both the tool magazines designed as round magazines and the tool magazines designed as cog strips may also be fastened on one or more sides on the machine column, in which case the spindle is brought into the change position before the tool carrier of the tool magazine for the tool change.

The features and advantages of the tool change device according to the present invention, e.g., for a multispindle two-station CNC machining center, can be summed up as follows:
1. Only the lips of the tools are changed. As a result, it is possible to use especially lightweight tools with a small space requirement and, on the other hand, a large number of tools can be accommodated in the tool magazine in a small space.
2. The tools are changed directly into the revolver with short setting-up time and the tool change is performed automatically and without the intervention of the operating personnel.
3. The tool shank is of a cylindrical design and the chips can be stripped off from the tool shank during the introduction of the tools by means of guide sleeves designed as stripping rings. High accuracy of centering is reached by eliminating holes in the clamping diameter.
4. The precision tool carrier on the spindle has a fluid-actuated hydraulic expansion chuck. Mounting of the tool without clearance is possible as a result.
5. A plurality of tools located in parallel to one another can be deposited on the magazines and the tool change is possible by a simple rotary and/or translatory movement.
6. Two stripping rings are fastened to the round magazine. Precentering of the spindle is possible by means of the outer ring and chip particles are stripped off by the movement of the first ring on the tool shank.
7. If needed, a plurality of revolvers with associated tool magazines can be accommodated in the work space and the individual magazines can be replaced as well.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
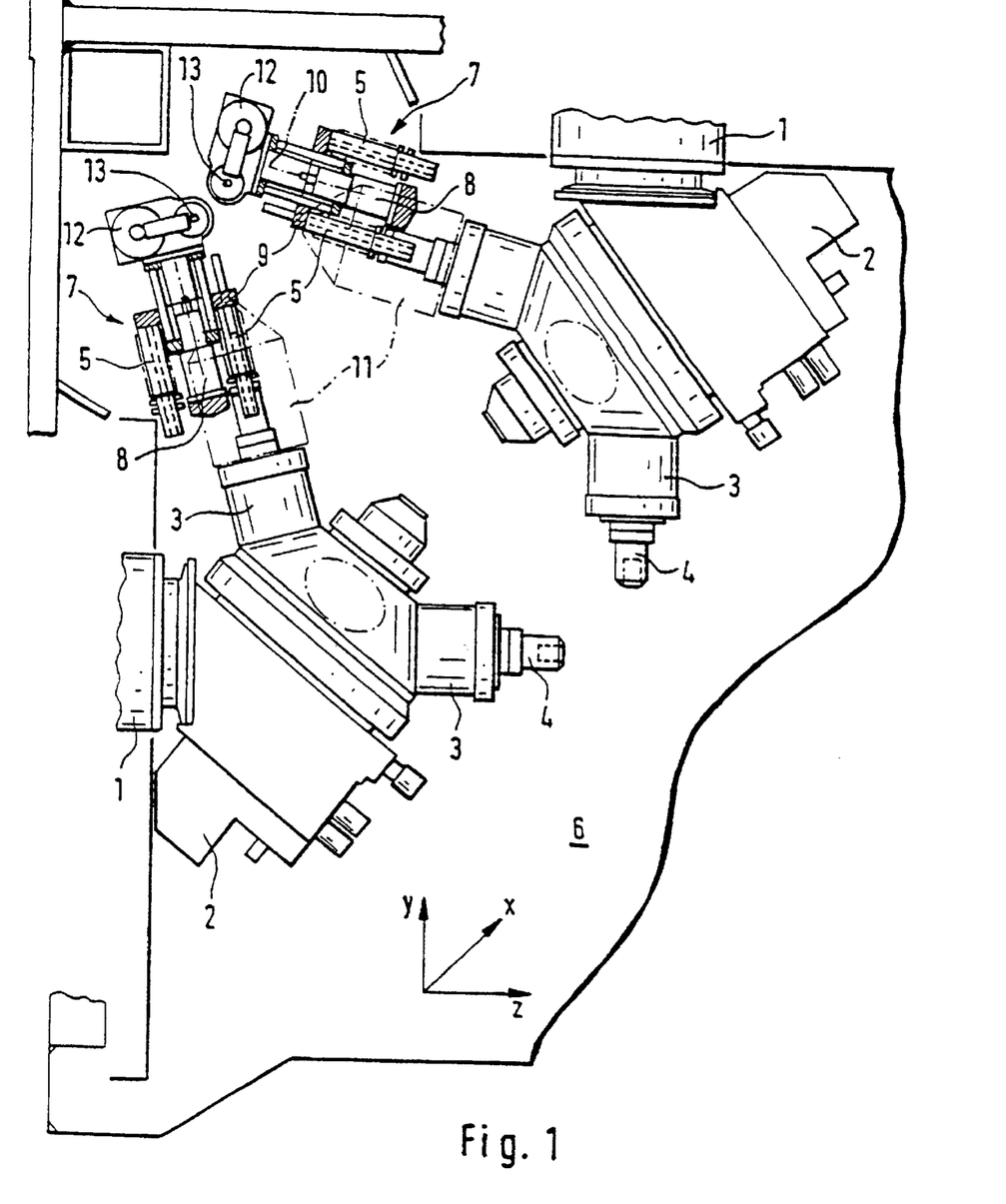
FIG. 1 is a side view showing tool magazines arranged at an angle in relation to one another for two revolver heads, which are arranged at right angles to one another in a work space and are displaceable in the X, Y and Z directions in relation to one another, wherein the change device are in the respective changing positions.
Figure 2:
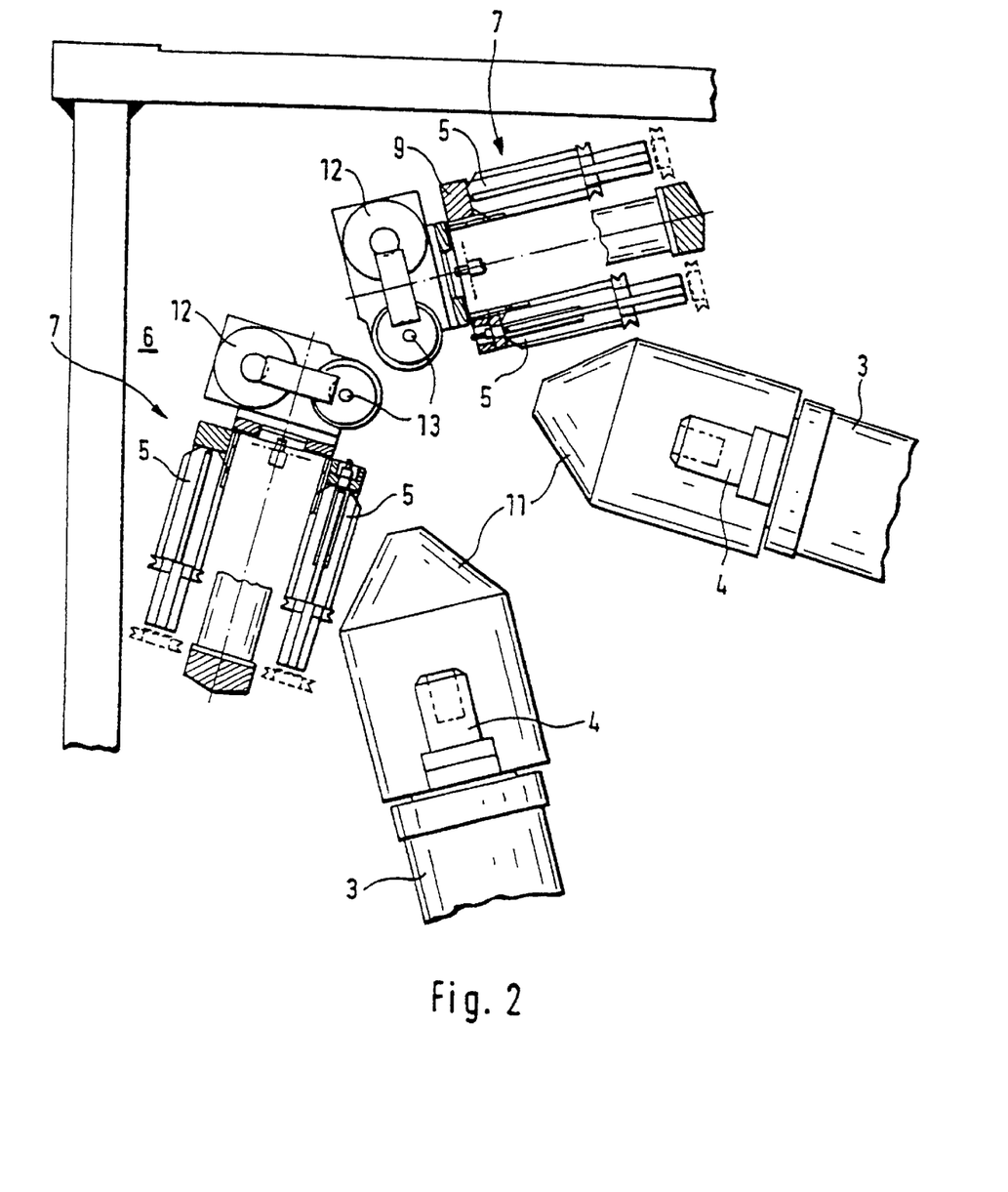
FIG. 2 is an enlarged view compared with FIG. 1, in which the tool magazines are pivoted into the resting position around the tilt axes.

Referring to the drawings in particular, FIG. 1 shows two work spindles 1 arranged at right angles to one another with a revolver head 2 each arranged rotatably via a switch shaft. One work spindle is displaceable at the horizontal ceiling of the work space 6 in the three directions X, Y and Z and the other work spindle 1 is likewise displaceable in the X, Y and Z directions at the vertical side wall independently from the other work spindle and together with the tool magazine 7 at least over the entire X axis. The individual spindles 3 of the revolver heads 2 can be rotated one after another into their horizontal and vertical working positions. In the view in FIG. 1, two tool magazines 7, which are displaceable together with the associated revolver head in the X direction, are arranged in the left upper corner of the work space 6. For a tool change, the revolver heads 2 are displaced in the Y and Z directions to the extent that one tool carrier 4 of the revolver head is located opposite a tool carrier 9 of the tool magazine 7 pivoted into the change position around the tilt axis 13. After a corresponding centering, the tool 5 is pushed by means of the actuating device 8 from the tool carrier 9 of the tool magazine 7 into the tool carrier 4 of the revolver head 2. The actuating device 8 is a lifting cylinder. The tool carrier 4 is designed as a hydraulic expansion chuck. When the lifting cylinder is released, the tool carrier 9 is moved back into the starting position by means of the compression spring 17 shown in FIGS. 4 and 5. After the conclusion of the tool transfer to a spindle 3, the tool magazine can be rotated around the central axis of rotation 10 by means of the rotating drive 12 and another tool change can take place after a corresponding rotation of the revolver head 2. After the conclusion of the tool change, the tool magazines 7 can be pivoted into the resting position shown in FIG. 2 around the tilt axis 13 in order to keep free the necessary outer contour 11 for the tools 5.

Figure 3:
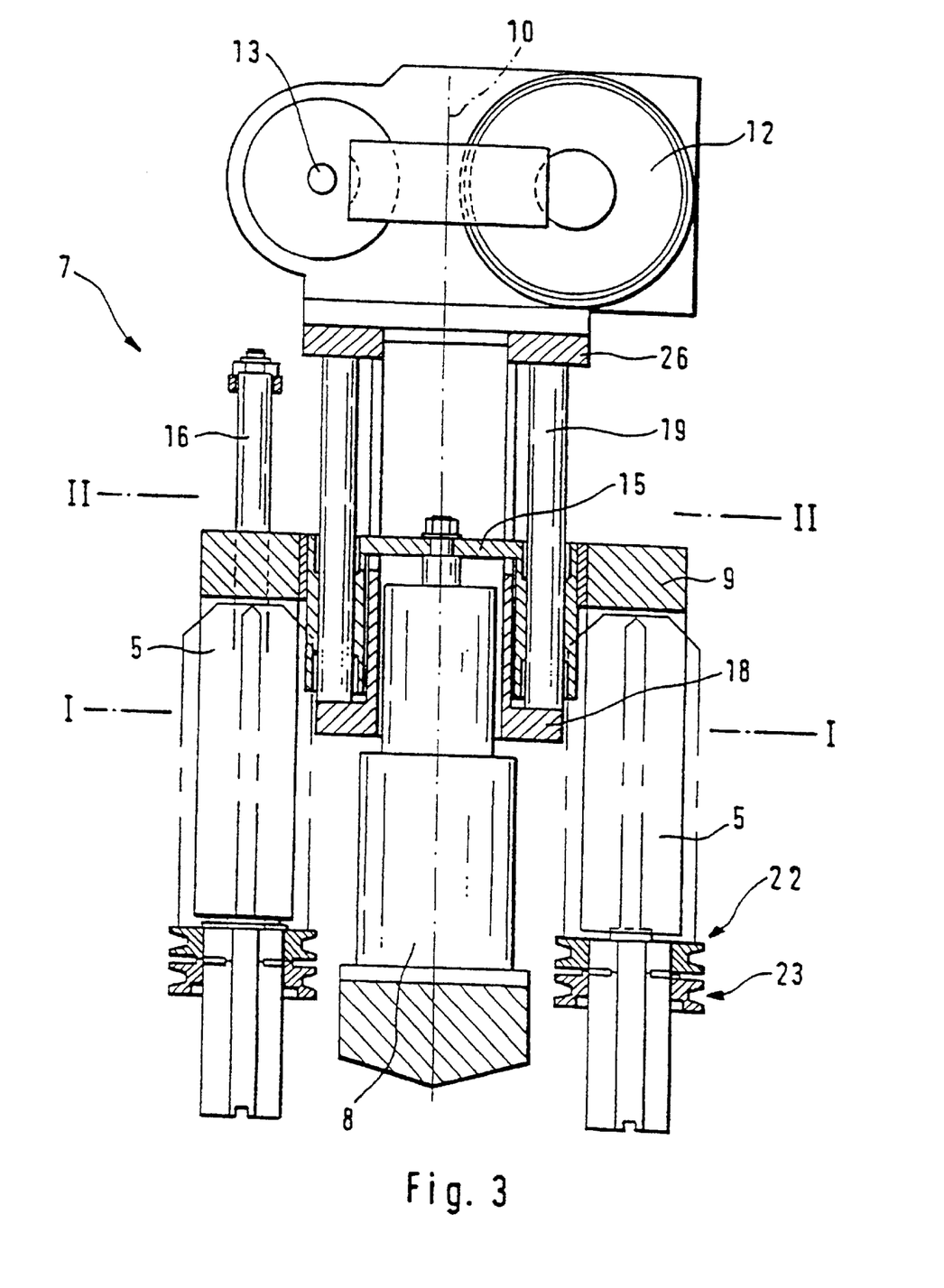
FIG. 3 is a sectional view of a tool magazine with two tools in the tool carriers.
Figure 4:
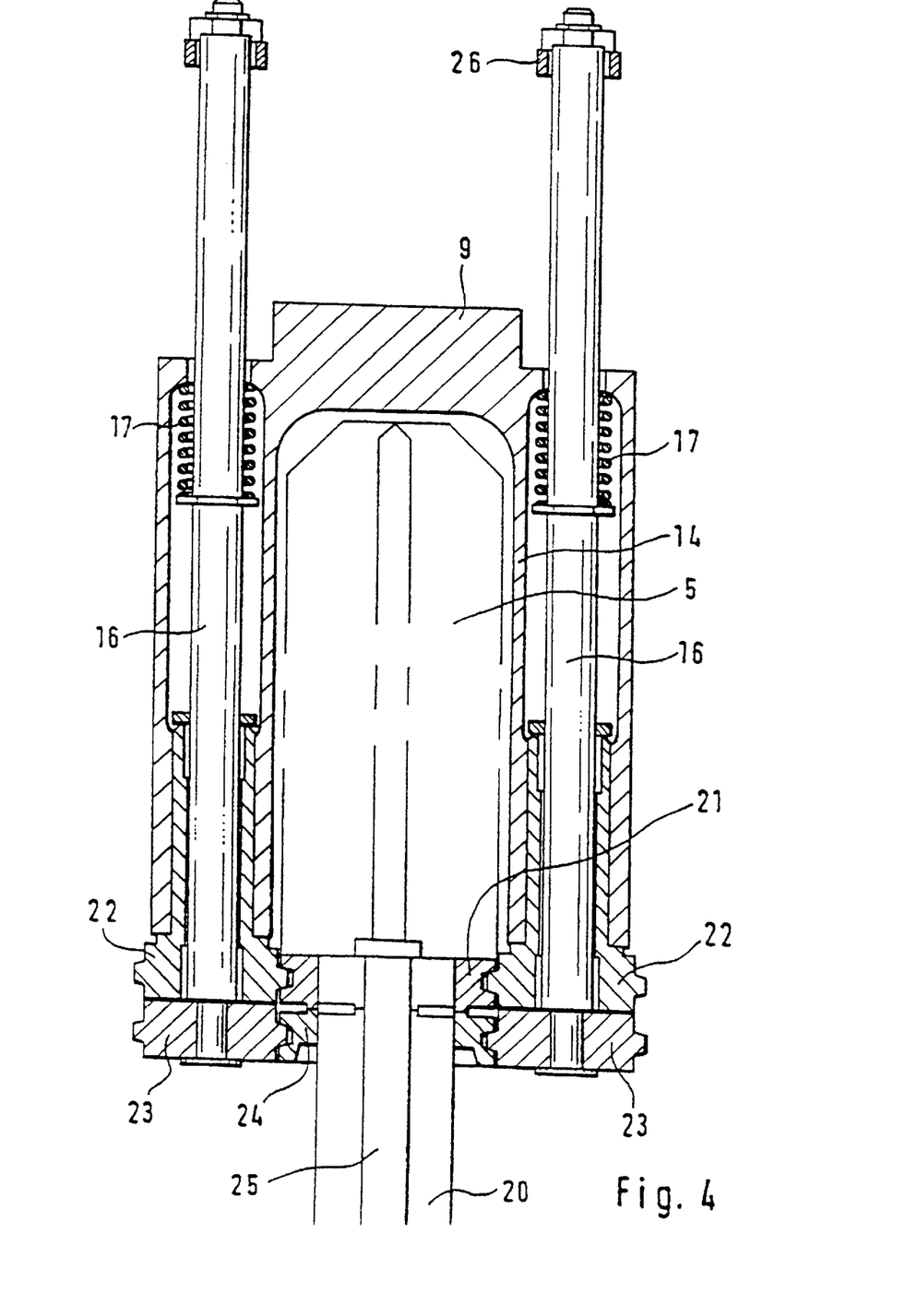
FIG. 4 is an even more enlarged view of a tool carrier with a tool arranged therein.
Figure 5:
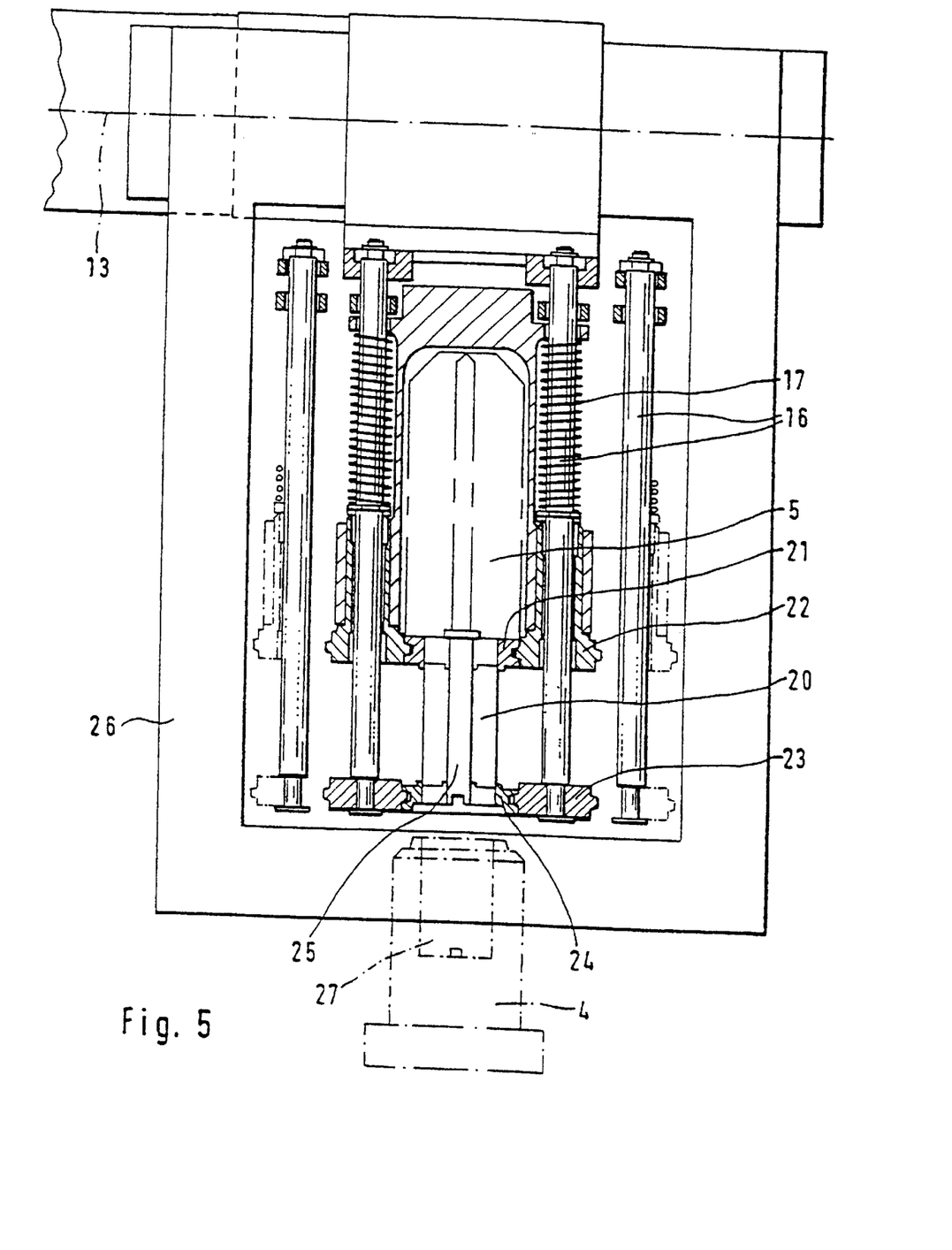
FIG. 5 is a partial side view of the tool change device with a tool arranged in the housing and with a tool carrier of a spindle arranged in front of it.

FIGS. 3 and 4 show tools 5 in the chuck of the tool magazine 7. The compression springs 17 guided on the guide elements 16 are now compressed (see FIG. 4), so that the mounting collar 22 of the tool carrier 9 is in contact with the mount 23, on the one hand, and the tool collar 21 rigidly arranged on the tool shank 20 is in contact with the guide sleeve 24, on the other hand. FIG. 5 shows for comparison the released position of the compression springs 17. The entire tool including the tool shank 20 is now enclosed in the housing 26 of the tool magazine 7 and the mounts 23 and the guide sleeve 24 designed as a stripper form a certain protection against the penetration of chip particles. As is apparent especially from FIGS. 4 and 6, plate springs 14, which are pressed from two sides on the outside against the tools 5 and thus hold the tools in position, are located at the tool carrier 9.

After the positioning and centering of the tool carrier 4 of a spindle 3 before a tool carrier 9 of the tool magazine 7 (see FIG. 5), the tool is pushed out of the tool magazine by actuating the lifting cylinder 8 against the force of the compression springs 17 and is moved into the hydraulic expansion chuck of the tool carrier 4 of the spindle 3. After actuating the hydraulic expansion chuck, the lifting cylinder can be released and optionally returned into the storage position in the tool magazine by means of the compression springs 17. As is apparent from FIGS. 3, 7 and 8, the actuating device 8 or the lifting cylinder are arranged centrally in the tool magazine 7 and they move the bridge 15 guided on the guide elements 19 and the change slide 18, 18' in the direction of the axis of rotation 10.

Figure 6:
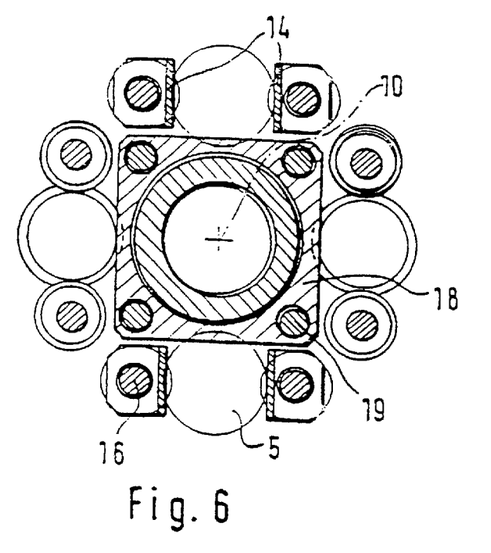
FIG. 6 is a sectional view along line I—I in FIG. 3 through a round magazine with four tool carriers.
Figure 7:
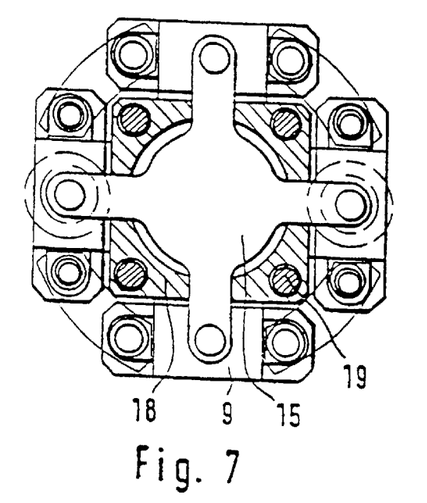
FIG. 7 is sectional view along line II—II in FIG. 3.
Figure 8:
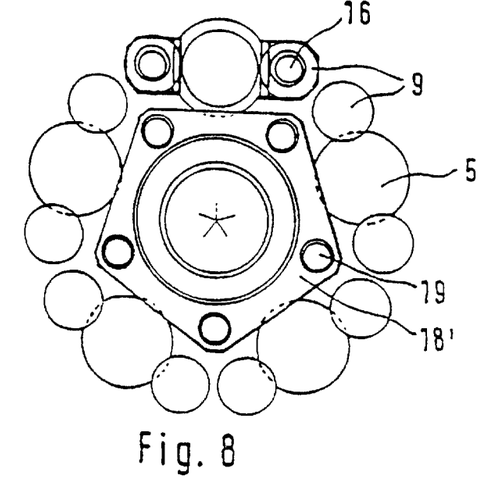
FIG. 8 is a sectional view corresponding to FIG. 7 through a tool magazine with five tool carriers.
Figure 9:
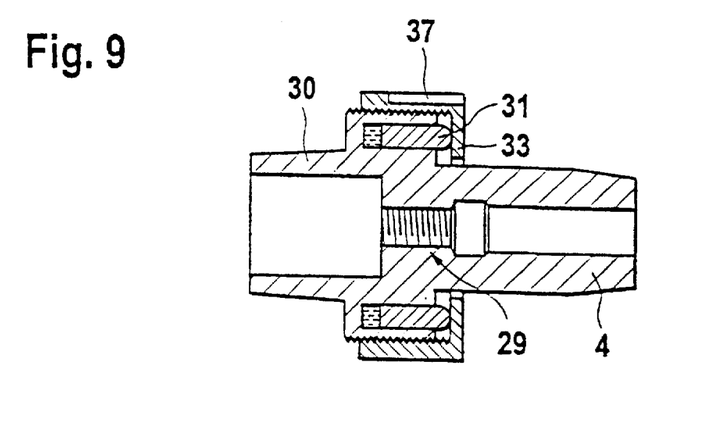
FIG. 9 is a sectional view of a spindle tip with tool carrier and hydraulic expansion chuck arranged therein.

FIGS. 6 and 7 show various sectional views of a tool magazine with four tool carriers 9. In this arrangement, the bridge 15 has an essentially cross-shaped design with an outwardly directed arm each as a connection to the tool carriers 9. FIG. 8 shows a tool magazine with five mounting places and with a correspondingly designed five-sided change slide 18'. The tools 5 shown have a hole 25 each for the supply of cooling lubricant. A free space, which can receive chip particles being pushed by the tool shank 20 before it during the pushing in of the tool shank 20 into the hydraulic expansion chuck, is additionally designated by 27 within the tool carrier 4 in FIG. 5.

FIGS. 9 through 12 show various possibilities for the automatic actuation of the hydraulic expansion chuck 29 by means of the spindle 3. According to FIG. 9, the releasing and clamping of the hydraulic expansion chuck 29 is carried out by means of a threaded ring 33, which moves one or more hydraulic pistons 31 in the axial direction and thus exerts pressure on the hydraulic medium, which presses the axially parallel holding surfaces of the hydraulic expansion chuck against the tool shank 20. A recess 37 is shown on the outer circumference of the threaded ring 33. The recess 37 acts as a rotation prevention device in cooperation with corresponding attachments on the tool carrier 9 of the tool magazine 7 and thus moves the threaded ring 33 in relation to the tool carrier 4 during the rotation of the tool carrier 4.

Figure 10:
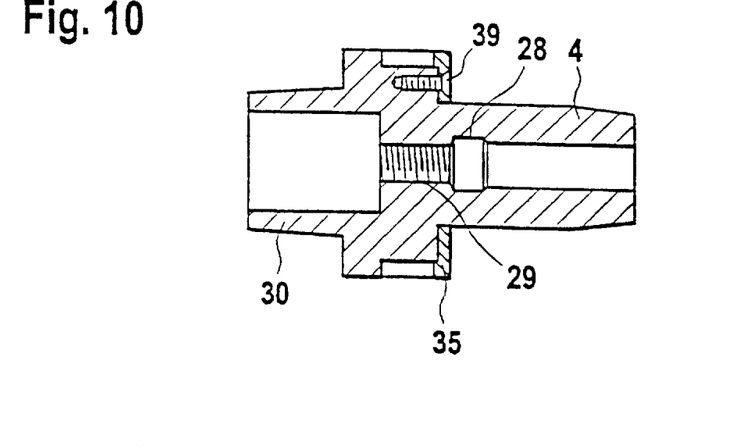
FIG. 10 is another embodiment of the spindle tip shown in FIG. 9.
Figure 11:
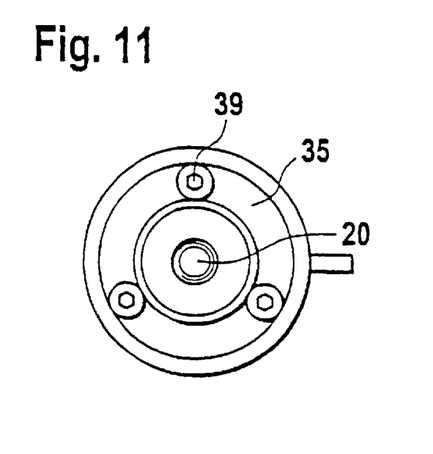
FIG. 11 is a front view of the spindle tip of FIG. 10.
Figure 12:
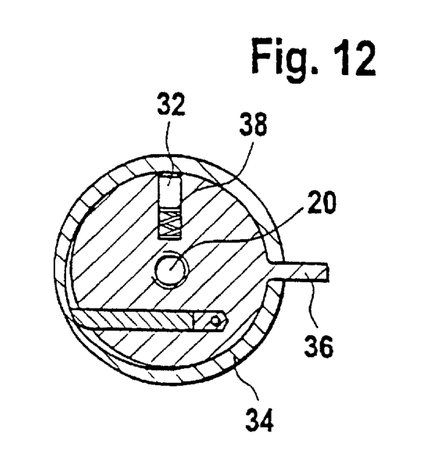
FIG. 12 is a sectional view of the spindle tip of FIG. 10 in the area of the hydraulic expansion chuck.

In the alternative embodiment according to FIGS. 10 through 12, an eccentric ring 34 is arranged rotatably movably on the tool carrier 4 in the area of the hydraulic expansion chuck 29 and is positioned by means of the holding ring 35 and the screws 32. By rotating the eccentric ring 34, the hydraulic piston 32 is moved radially on the eccentrically arranged inner surface and thus it brings about a change in the hydraulic pressure. An attachment 36 is arranged on the eccentric ring 34 as a rotation prevention device. The hydraulic piston 32 is pressed by a spring 38 in the outward direction against the eccentric surface of the eccentric ring 34.

Figure 13:
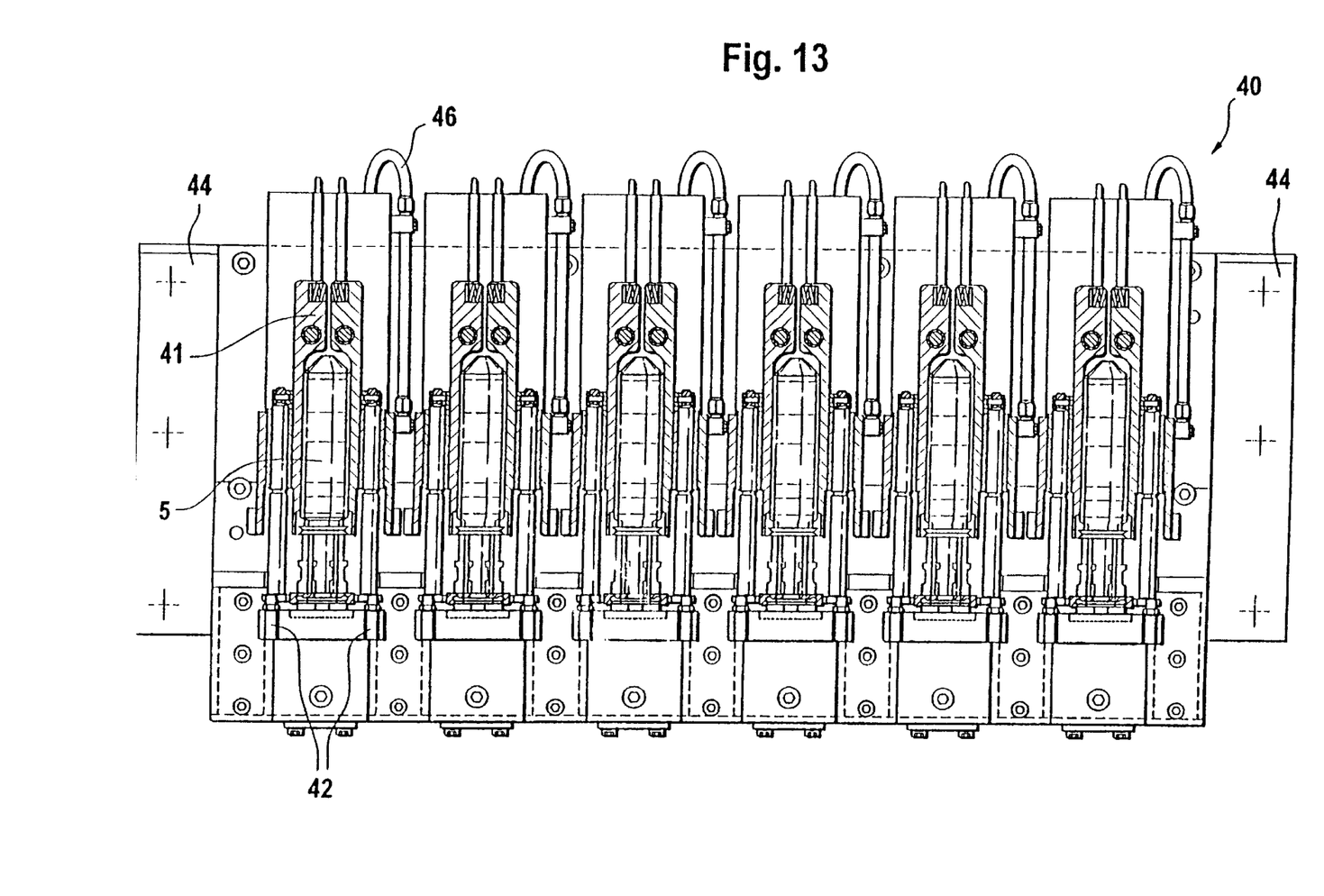
FIG. 13 is a view of the tool magazine with tool carriers arranged next to one another, which is designed as a cog strip and is rigidly arranged on the machine column.
Figure 14:
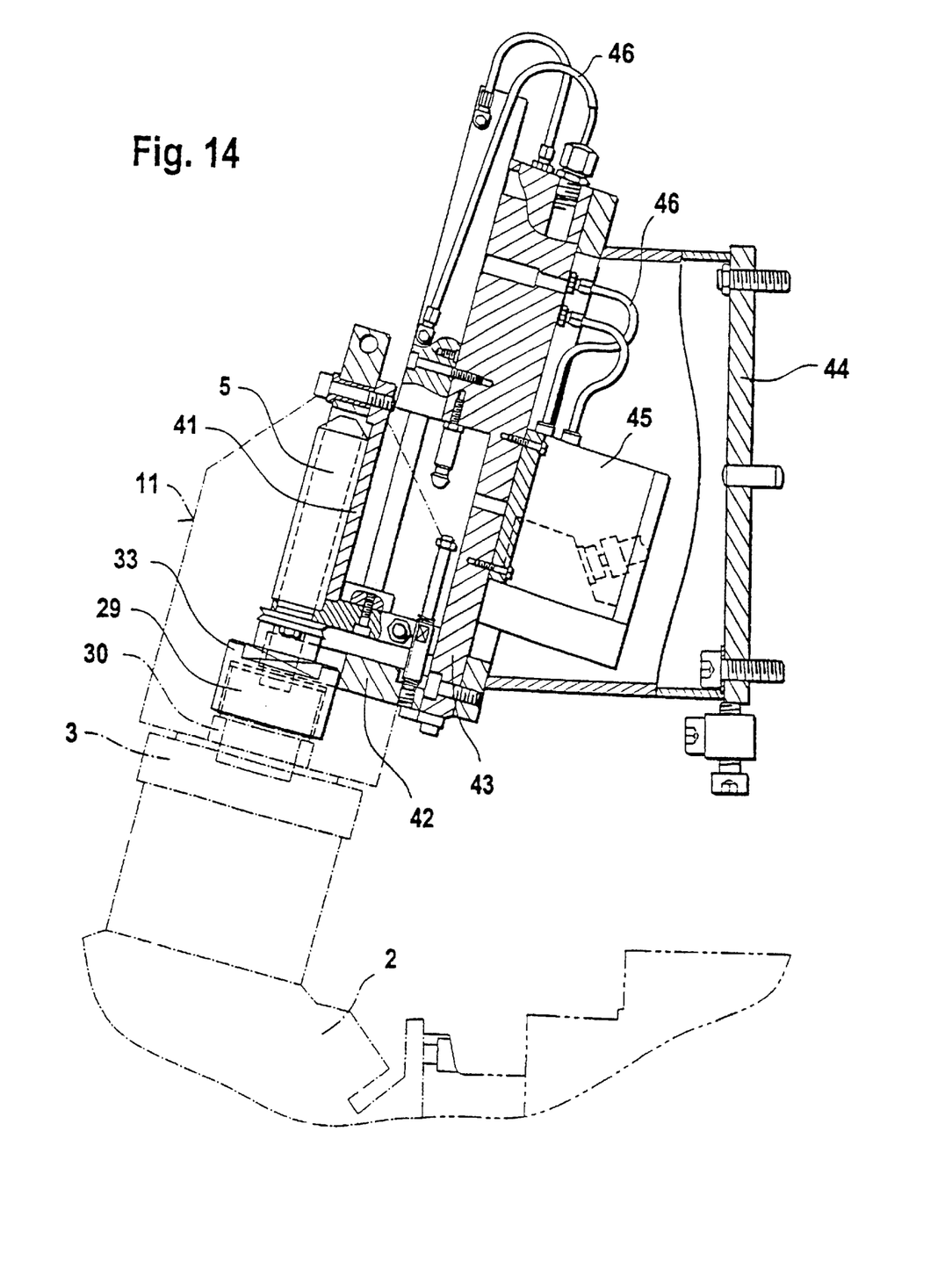
FIG. 14 is a partially sectional view of a tool magazine according to FIG. 13 with the spindle tip having moved into a fork.
Figure 15:
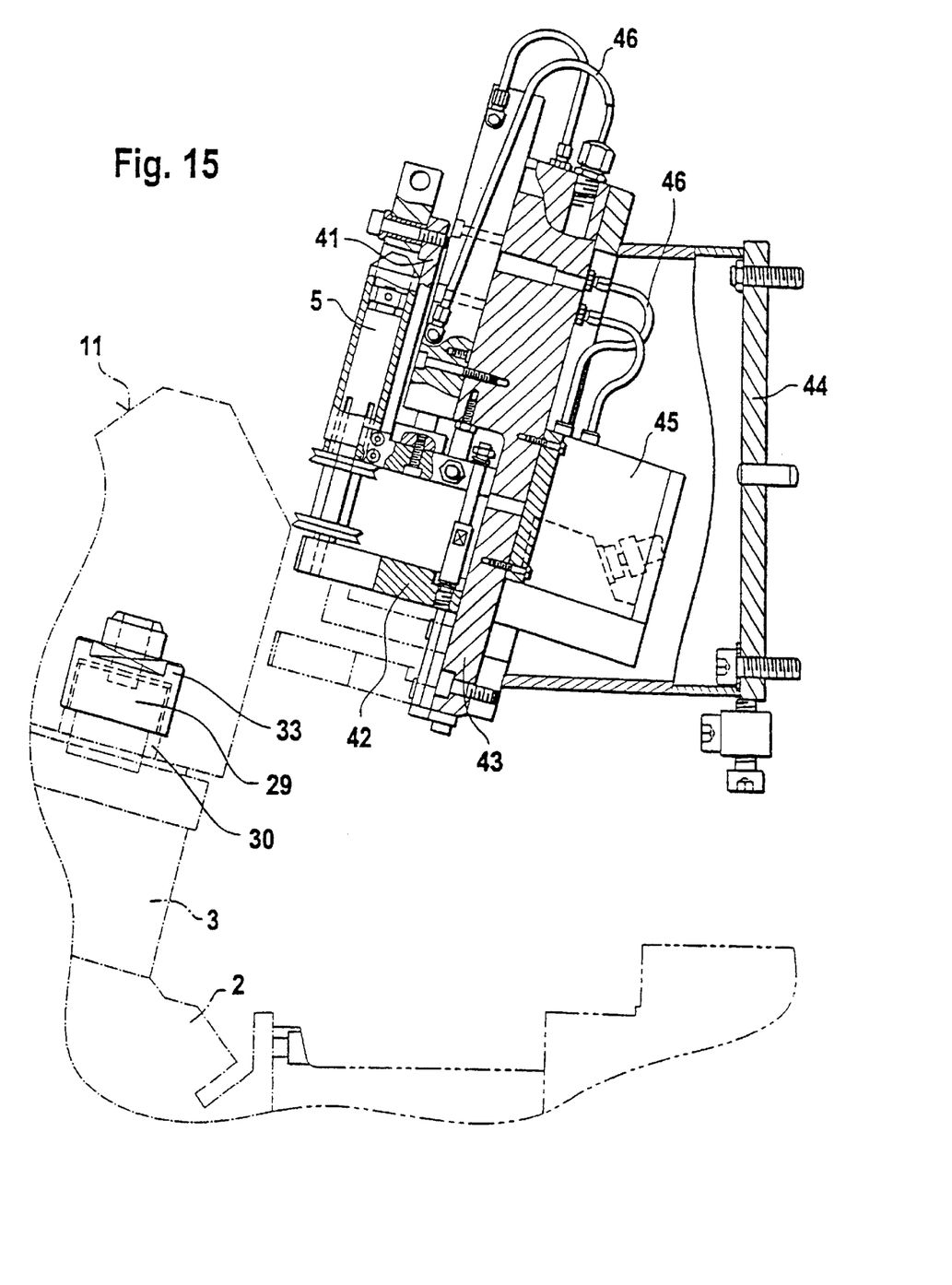
FIG. 15 is a partially sectional view of a tool magazine according to FIG. 13 with the spindle tip 30 withdrawn.

FIG. 13 shows a tool magazine designed as a cog strip, which is detachably fastened to the housing of the work space by means of a carrier 44. In this tool magazine, six tool carriers 41 are arranged next to one another for the tools 5. For example, all five tools of a tool revolver can thus be changed directly one after another, and an empty place is usually available on the tool magazine. This prior-art tool magazine additionally has a fork 42 in each tool mounting site, into which the threaded ring 33 designed as a tensioning nut or the eccentric ring 34 for actuating the hydraulic expansion chuck 29 is moved. The recess 37 designed as a wrench surface or the attachment 36 is connected to the fork 42 and secured against rotation. By rotating the spindle 3, the threaded ring 33 and the hydraulic pistons 31 are moved axially and the hydraulic expansion chuck 29 is thus actuated. According to FIGS. 14 and 15, a baseplate 43 is connected to the carrier 44 in addition to the fastening of the cog strip 40. Among other things, a valve block 45 and flexible pressure tubings 46 for the actuating and guide device arranged at the cog strip 40 are fastened on the baseplate 43.

While specific embodiments of the invention have been shown and described in detail to illustrate the application of the principles of the invention, it will be understood that the invention may be embodied otherwise without departing from such principles.

What is claimed is:

1. A machine tool, especially for machining of workpieces, including triaxial machining of workpieces, the machine tool comprising:

at least one machining unit, which has at least one work spindle which can be rotatably driven around an axis of rotation, the spindle having a revolver head with a plurality of driven spindles, which each carry a tool in a tool carrier and are displaceable in a work space in the X, Y and Z directions;

at least one tool magazine arranged in said work space;

an actuating device for the automatic change of tools, without use of an intermediate holder, directly from said tool carrier at said spindle into said tool carrier at said tool magazine and vice versa;

a tool carrier at said driven spindle with a hydraulic expansion chuck, which can be pressed automatically against a tool shank by operation of said spindle;

a ring arranged rotatably movably on said tool carrier of said driven spindle for actuating at least one linearly movable hydraulic piston for tensioning and releasing said hydraulic expansion chuck while pressure of the hydraulic medium of said hydraulic expansion chuck changes; and elements arranged on said ring for preventing rotation, said elements fixing said ring at said tool carrier of said tool magazine during a releasing or a tightening of said hydraulic expansion chuck by rotating said tool carrier.

2. A machine tool in accordance with claim 1, wherein said hydraulic piston is pressed to an outside by spring force and is moved in an inward direction by said ring against the spring force to change the pressure in the hydraulic space.

3. A machine tool in accordance with claim 1, wherein at a location adjacent to said ring there is a threaded ring, an eccentric ring or a ring with a slot for actuating said hydraulic piston directed axially, radially or obliquely in relation to the axis of rotation.

4. A machine tool in accordance with claim 2, wherein by said ring is a threaded ring, an eccentric ring or a ring with a slot for actuating said hydraulic piston directed axially, radially or obliquely in relation to the axis of rotation.

5. A machine tool in accordance with claim 1 wherein said driven spindle and said tool magazine are displaceable together in the work space and are movable in relation to one another for the automatic tool change.

6. A machine tool in accordance with claim 2 wherein said driven spindle and said tool magazine are displaceable together in the work space and are movable in relation to one another for the automatic tool change.

7. A machine tool in accordance with claim 3 wherein said driven spindle and said tool magazine are displaceable together in the work space and are movable in relation to one another for the automatic tool change.

8. A machine tool in accordance with claim 1, wherein said tool magazine is a round magazine with a central axis of rotation and a rotating drive, said tool carriers being arranged axially in parallel distributed over a circumference on a bridge and a central actuating device acting in a direction of an axis of rotation.

9. A machine tool in accordance with claim 1, wherein said central actuating device has a change slide, which is mounted displaceably on guide elements fastened on a housing of said tool magazine.

10. A machine tool in accordance with claim 8, wherein said tool magazine can be displaced and/or pivoted around a tilt axis from a change position into a resting position outside an outer contour of said tools arranged on said revolver head.

11. A machine tool in accordance with claim 9, wherein said tool magazine can be displaced and/or pivoted around a tilt axis from a change position into a resting position outside an outer contour of said tools arranged on said revolver head.

12. A machine tool in accordance with claim 8, wherein said tool magazine has guide elements for the displacement of said tool carriers during a tool change and compression springs, which act against said actuating device and press said tool carriers into a tool carrier storage position in said housing of said tool magazine, are arranged at said tool carriers and/or at said guide elements.

13. A machine tool in accordance with claim 9, wherein said tool magazine has guide elements for the displacement of said tool carriers during a tool change and compression springs, which act against said actuating device and press said tool carriers into a tool carrier storage position in said housing of said tool magazine, are arranged at said tool carriers and/or at said guide elements.

14. A machine tool in accordance with claim 10, wherein said tool magazine has guide elements for the displacement of said tool carriers during a tool change and compression springs, which act against said actuating device and press said tool carriers into a tool carrier storage position in said housing of said tool magazine, are arranged at said tool carriers and/or at said guide elements.

15. A machine tool in accordance with claim 1, wherein said tool magazine is designed as a cog strip with tool carriers arranged next to one another.

16. A machine tool in accordance with claim 1, wherein said tool magazine is one of a round magazine or as a cog strip and is fastened in said work space on one or more sides on a machine column.

* * * * *